UNITED STATES PATENT OFFICE.

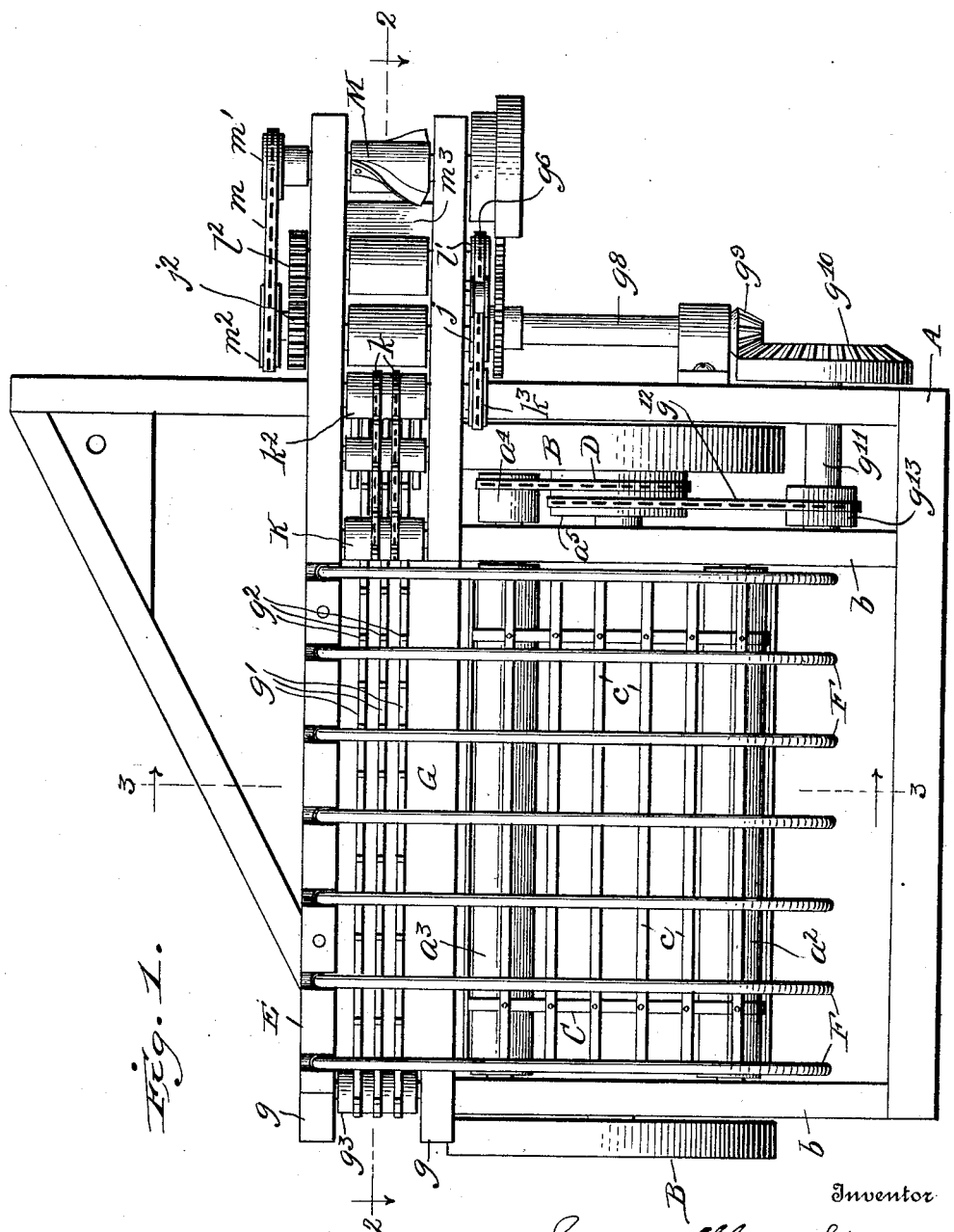

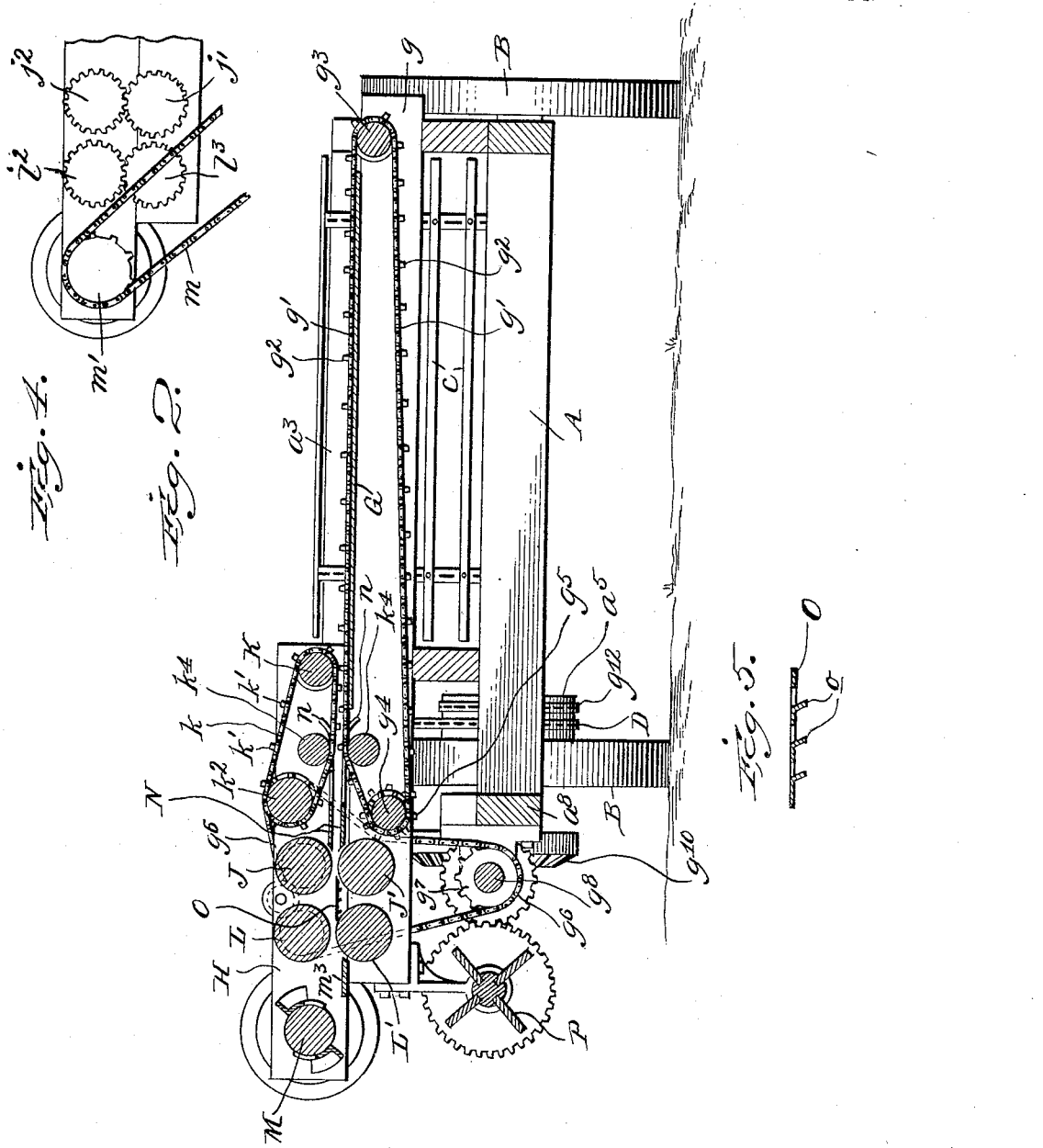

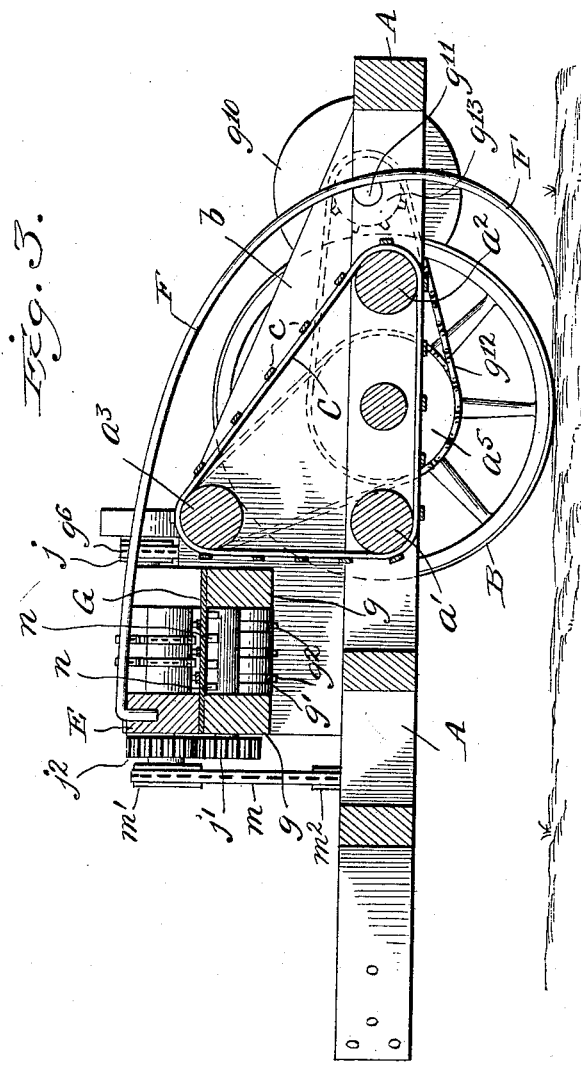

SAMUEL GLENN SPENCER, OF PAYSON, ILLINOIS.

COMBINED RAKE AND STALK-CUTTER.

1,105,006.

Specification of Letters Patent. Patented July 28, 1914.

Application filed October 19, 1912. Serial No. 726,800.

*To all whom it may concern:*

Be it known that I, SAMUEL GLENN SPENCER, a citizen of the United States, residing at Payson, in the county of Adams and State of Illinois, have invented certain new and useful Improvements in Combined Rakes and Stalk-Cutters; and I do hereby declare the following to be a full, clear, and exact description of the same, reference being had to the accompanying drawing, forming part of this specification, and to the figures and letters of reference marked thereon.

This invention relates to machines for gathering up from the field the corn stalks left lying on the ground after harvesting, cutting the stalks into short sections, and then depositing or scattering the pieces upon the field again to allow them to decay and thus be utilized as a fertilizer.

To these ends the invention consists in certain novel details of construction and combinations and arrangements of parts, all as will be now described and the particular features of novelty pointed out in the appended claims.

In the accompanying drawings, wherein is illustrated the preferred embodiment of the invention,—Figure 1 is a top plan view of a machine embodying the present invention; Fig. 2 is a section on the line 2—2, Fig. 1; Fig. 3 is a section on the line 3—3, Fig. 1; Fig. 4 is a detail elevation of a portion of the machine; Fig. 5 is a sectional view of the screen.

Similar letters of reference in the several figures indicate the same parts.

Referring to the drawings, the letter A indicates the main frame of the machine supported on suitable ground wheels B, the frame being extended at the front for the attachment of the draft animals. Journaled in the side beams of the frame are rollers $a'$, $a^2$, a third roller $a^3$ being journaled in the upper ends of inclined side pieces $b$ carried by the side beams. Over these rollers travels an endless apron C, carrying transverse slots $c$, motion being imparted to the apron by means of the roller $a^3$, which carries at one end a sprocket wheel $a^4$ over which passes a sprocket chain D, which also passes over a sprocket wheel $a^5$ on one of the ground wheels B. Secured to a suitable cross bar or frame E at the front of the machine are rake teeth F, which extend rearwardly and downwardly over the apron C, and are curved inwardly at their lower ends, by means of which the stalks are gathered from the ground and delivered upon the apron C, as the machine is drawn over the field. At the front of the machine and extending transversely thereof is a platform G carried by cross beams $g$, $g$ and over this platform travel chains $g'$ having lugs or projections $g^2$, these chains passing over rollers $g^3$, $g^4$, journaled in the cross beams $g$, $g$. The chains $g'$ are driven from the roller $g^4$, which carries a sprocket wheel $g^5$ over which passes a sprocket chain $g^6$. The sprocket chain $g^6$ is driven from a sprocket wheel $g^7$, carried by a shaft $g^8$, journaled in suitable bearings carried by a beam or frame $a^8$, having at one end a small bevel gear $g^9$ with which meshes a large gear wheel $g^{10}$, mounted on a stub shaft $g^{11}$, driven by means of a sprocket chain $g^{12}$, passing over a sprocket wheel $g^{13}$ on the stub shaft $g^{11}$, and sprocket wheel $a^5$. Carried in a suitable frame H at the front of the machine are superposed rollers J J', the upper roller J driven by sprocket chain $g^6$ passing over sprocket wheel $j$, on the end of the shaft of roller J. On the end of the shaft of roller J' is a gear wheel $j'$ which meshes with a gear wheel $j'$ on the end of shaft of roller J, by means of which the lower roller J' is driven. At the delivery end of the platform G is a roller K over which pass conveyer chains $k$, $k$, having lugs or projections $k'$ $k'$, these chains passing over a second roller $k^2$ driven by sprocket chain $g^6$ through sprocket wheel $k^3$ on shaft of roller $k^2$. Small idler rollers $k^4$, $k^4$ are utilized to guide the chains $g'$ and $k$.

Rollers J, J' constitute crushing rollers for crushing and breaking up the clods of dirt and other material which may be carried by the stalks, and beyond the rolls J, J' are a second pair of superposed rollers L, L', the upper one of which is driven by the sprocket chain $g^6$, passing around sprocket wheel $l'$ on the end of the shaft of roller L. On the opposite end of the shaft is a gear wheel $l^2$, which meshes with a gear wheel $l^3$ on the shaft of roller L', by means of which the roller L' is driven. These rolls L, L' constitute feed rolls between which the stalks are fed along to a rotary cutter M, journaled near the end of frame H, and driven by means of a sprocket chain $m$, passing over a sprocket wheel $m'$ on the cutter shaft, and a sprocket wheel $m^2$ on the end of shaft $g^8$. The blades of the cutter coöperate with the cutting edge of a plate $m^3$ for severing the stalks.

In order to direct and guide the stalks formed with diverging fingers $n, n$, between crushing rolls J J', guide plates N, N, spaced apart a suitable distance, extend from the crushing rolls to a point near the delivery end of platform G, where they are formed with diverging fingers $n, n,$ between which the stalks are guided. Interposed between the rolls J, J' and L, L' is a sieve or screen O, consisting of a metal plate having transverse slots, the metal along the edge of the slot being turned down slightly as shown at $o$. Through this sieve dirt and debris will fall, the stalks being carried on to the cutter. The sections of the stalks cut by the cutter drop down and are scattered or spread over the ground by means of the spreader P geared to the shaft $g^8$.

In operation, the machine is drawn over the field, and the stalks lifted by the rake teeth and delivered upon the inclined traveling apron, the stalks lying substantially transversely across the apron. From this apron they are delivered upon the conveyer chains running over the platform G, at right angles to the apron, by which the stalks are carried lengthwise along the platform. At the end of the platform the stalks are caught by the chains $k, k$ and carried along between the guide plates, thence between crushing and feed rolls to the rotary cutter, and cut up into pieces. Some of the stalks delivered from the apron upon the platform G may not always be delivered parallel to the platform, and must be straightened out so that they may be delivered endwise to the operating rolls. This straightening out is accomplished by the chains $k, k$ above the stalks, which run slower than chains $g'$ below, owing to the difference in size of sprocket wheels $g^4$ and $K^3$.

Having thus described my invention, what I claim as new and desire to secure by Letters Patent of the United States, is:

1. In a machine such as described embodying ground wheels, the combination with the upwardly inclined traveling apron, extending transversely of the machine, rake teeth extending beyond the lower end of the apron, whereby the stalks are delivered upon the apron, an endless conveyer traveling at right angles to the apron at the delivery end thereof and upon which the stalks are deposited, a cutting mechanism, feed rolls to which the stalks are delivered by the conveyer, for feeding the stalks to the cutting mechanism, and means intermediate the conveyer and feed rolls for straightening the stalks whereby they may be delivered substantially end on to the cutting mechanism, and driving mechanism driven from the ground wheels.

2. In a machine such as described, the combination with the apron upon which the stalks are deposited, a traveling conveyer running at right angles to said apron, a cutter, feed rolls to which the stalks are delivered by the conveyer for feeding the stalks to the cutter, endless chains located over a portion of said conveyer and traveling at a slower rate than the conveyer, whereby the stalks passing between said chains and conveyer will be caused to lie substantially parallel, and be delivered endwise to the feed rolls and cutter.

3. In a machine such as described, the combination with the apron upon which the stalks are delivered, conveying chains traveling at right angles to said apron, crushing and feed rolls, and guide plates between which the stalks are delivered from the conveyer chains, and guided to the rolls, a cutter for severing the stalks, and driving mechanism.

SAMUEL GLENN SPENCER.

Witnesses:
FAY V. DE BORD,
LAWRENCE E. EMMONS, Jr.

Copies of this patent may be obtained for five cents each, by addressing the "Commissioner of Patents, Washington, D. C."